United States Patent [19]
McCaully

[11] 3,899,527
[45] Aug. 12, 1975

[54] INTERMEDIATES FOR THE PREPARATION OF 1,3-DIHYDRO-2H-1,4-BENZODIAZEPIN-2-ONES

[75] Inventor: Ronald J. McCaully, Malvern, Pa.

[73] Assignee: American Home Products Corporation, New York, N.Y.

[22] Filed: Feb. 15, 1973

[21] Appl. No.: 332,861

Related U.S. Application Data

[62] Division of Ser. No. 802,345, Feb. 6, 1969, Pat. No. 3,763,171.

[52] U.S. Cl. ............... 260/488 GM; 260/239.3 T; 260/295 PA; 260/332.2 R; 260/346.8; 260/491; 260/519; 260/562 N; 260/562 P; 424/263; 424/275; 424/311; 424/324

[51] Int. Cl. ..................... C07c 69/16; C07c 69/28
[58] Field of Search ................................... 260/488

[56] References Cited
OTHER PUBLICATIONS
Chem. Abstracts, 48:1376h.

Primary Examiner—Vivian Garner
Attorney, Agent, or Firm—Robert Wiser

[57] ABSTRACT

Two routes for the preparation of 2-(2-acylamido-2-amino)-acetamidophenyl aryl ketones, used as intermediates in the synthesis of psycholeptic 1,3-dihydro-2H-1,4-benzodiazepin-2-ones are described. The first of these routes involves the formation of a 2-(2,2-diacyloxy)acetamidophenyl aryl ketone from glyoxylic acid and an aryl phenyl ketone via either a 2,2-diacyloxy acetyl halide or a 2,2-diacyloxy acetyl anhydride, conversion thereof to the corresponding 2-(2-acylamido-2-hydroxy) acetamidophenyl aryl ketone directly or via the 2-(2,2-dihydroxy)acetamidophenyl aryl ketone, formation of the corresponding 2-(2-acylamido-2-halo)acetamidophenyl aryl ketone, and conversion to the 2-(2-acylamido-2-amino)acetamidophenyl aryl ketone. The second route forms the 2-(2,2-dihydroxy)acetamidophenyl aryl ketone by reacting a 2,3-dicarboxylicacyl tartaric anhydride with a 2-aminophenyl aryl ketone to obtain a 2-(3-carboxy-2,3-acyloxy)propionamidophenyl aryl ketone, selectively hydrolyzing the so-obtained ketone and selectively oxidizing the product with a vic glycol cleaving agent.

2 Claims, 1 Drawing Figure

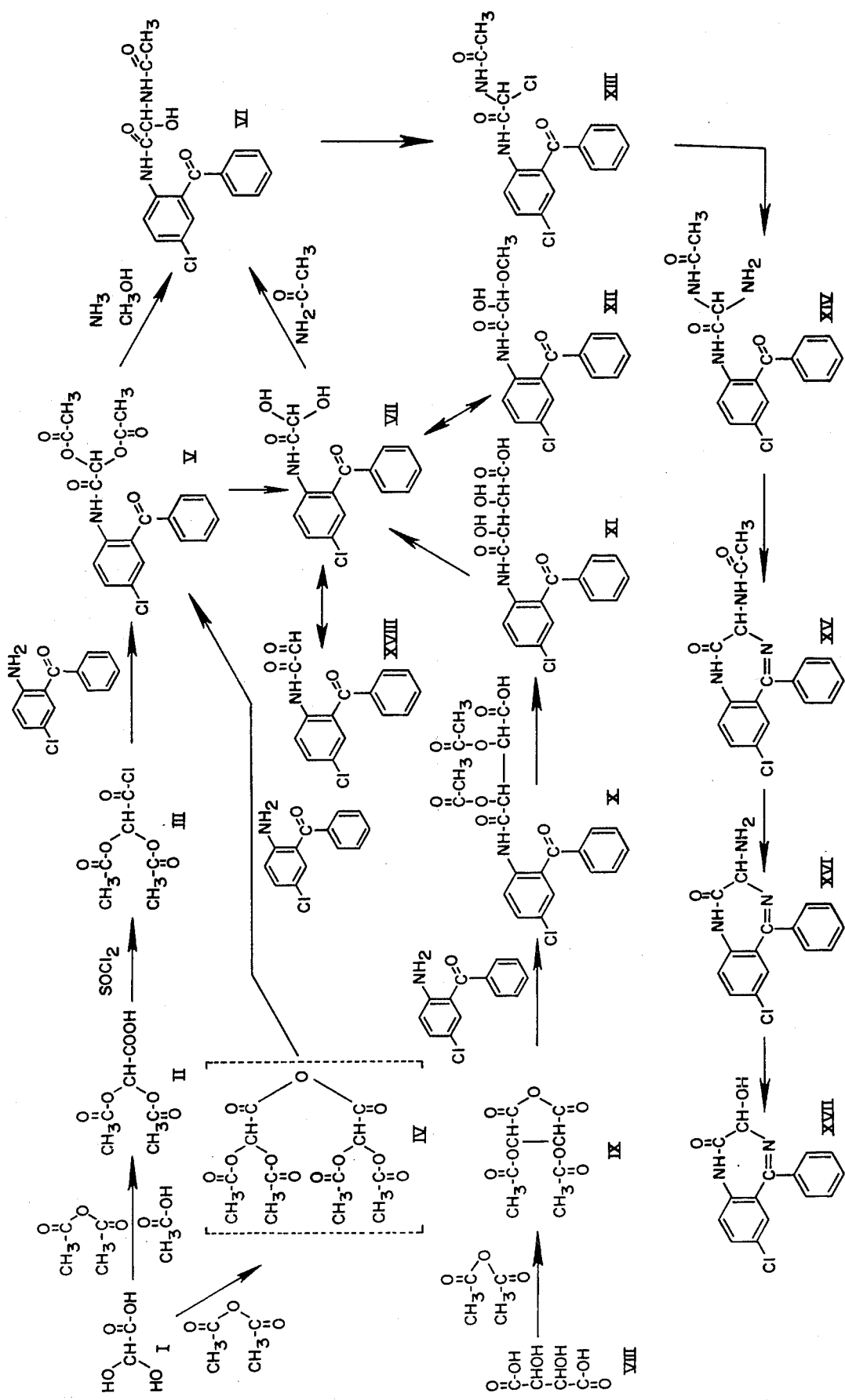

INTERMEDIATES FOR THE PREPARATION OF 1,3-DIHYDRO-2H-1,4-BENZODIAZEPIN-2-ONES

This is a division, of application Ser. No. 802,345, filed Feb. 6, 1969, and now U.S. Pat. No. 3,763,171.

BACKGROUND OF THE INVENTION

This invention relates to processes and intermediates for the preparation of compositions of matter classified in the art of chemistry as substituted 1,3-dihydro-2H-1,4-benzodiazepin-2-ones. Said benzodiazepines possess potent psycholeptic activity, and members of the class are presently in medical use throughout the world.

SUMMARY OF THE INVENTION

The invention sought to be patented in a principal process of making aspect, is described as residing in the concept of the sequence of reactions including (a) diacylating glyoxylic acid by treatment with a carboxylic acid anhydride of an acid having a pK higher than 3.75 in the presence of a carboxylic acid of pK higher than 3.75 to obtain a 2,2-dicarboxylicacyloxy acetic acid; (b) converting said diacyloxy acetic acid to the corresponding dicarboxylicacyloxy acetyl halide by treatment with a halogen-hydroxyl exchange agent; (c) reacting said halide with a 2-aminophenyl aryl ketone to obtain a 2-(2,2-diacyloxy)acetamido phenyl aryl ketone; (d) converting to a 2-(2-acylamido-2-hydroxy)acetamidophenyl aryl ketone by treatment with ammonia; (e) reacting said 2-(2-acylamido-2-hydroxy)acetamidophenyl aryl ketone with a halogen-hydroxyl exchange agent or a halogen acid to obtain the corresponding 2-(2-acylamido-2-halo)acetamidophenyl aryl ketone; (f) reacting said 2-(2-acylamido-2-halo)acetamidophenyl aryl ketone with ammonia to obtain the corresponding 2-(2-acylamido-2-amino)acetamidophenyl aryl ketone.

The invention sought to be patented in a specific step of the process of making aspect is described as residing in the concept of reacting glyoxylic acid with a carboxylic acid anhydride of an acid having a pK higher than 3.75 in the presence of a carboxylic acid of pK higher than 3.75 to obtain a 2,2-dicarboxylicacyloxy acetic acid.

The invention sought to be patented in a second specific step of the process of making aspect is described as residing in the concept of treating a 2,2-dicarboxylicacyloxy acetic acid with a halogen-hydroxyl exchange agent to afford the corresponding dicarboxylicacyloxy acetyl halide.

The invention sought to be patented in a third specific step of the process of making aspect is described as residing in the concept of converting a 2-(2,2-dicarboxylicacyloxy)acetamidophenyl aryl ketone to a 2-(2-acylamido-2-hydroxy)acetamidophenyl aryl ketone by treatment with ammonia.

The invention sought to be patented in a fourth specific step of the process of making aspect is described as residing in the concept of reacting a 2-(2-acylamido-2-hydroxy)acetamidophenyl aryl ketone with a halogen-hydroxyl exchange agent or a halogen acid to obtain the corresponding 2-(2-acylamido-2-halo)acetamidophenyl aryl ketone.

The invention sought to be patented in a fifth specific step of the process of making aspect is described as residing in the concept of reacting a 2-(2-acylamido-2-halo)acetamidophenyl aryl ketone with ammonia to obtain the corresponding 2-(2-acylamido-2-amino)acetamidophenyl aryl ketone.

The invention sought to be patented in a first alternate process of making aspect is described as residing in the concept of a sequence of reactions including: (a) selectively hydrolyzing a 2-(2,2-diacyloxy)acetamidophenyl aryl ketone with an inorganic base to obtain the corresponding 2-(2,2-dihydroxy) acetamidophenyl aryl ketone; and (b) converting said 2-(2,2-dihydroxy)acetamidophenyl aryl ketone to a 2-(2-acylamido-2-hydroxy)acetamidophenyl aryl ketone by condensation with a lower alkyl primary amide.

The invention sought to be patented in a specific step of the first alternate process of making aspect is described as residing in the concept of condensing 2-(2,2-dihydroxy) acetamidophenyl aryl ketone with a lower alkyl primary amide to obtain a 2-(2-acylamido-2-hydroxy)acetamidophenyl aryl ketone.

The invention sought to be patented in a second alternate process of making aspect is described as residing in the concept of a sequence of reactions including: (a) reacting a 2,3-dicarboxylicacyl tartaric anhydride with a 2-aminophenyl aryl ketone to obtain a 2-(3-carboxy-2,3-dicarboxylicacyloxy) propionamidophenyl aryl ketone; (b) selectively hydrolyzing said 2-(3-carboxy-2,3-dicarboxylicacyloxy)propionamidophenyl aryl ketone; (c) oxidizing the so-obtained 2-(3-carboxy-2,3-dihydroxy)propionamidophenyl aryl ketone with a vic glycol cleaving agent to obtain the corresponding 2-(2,2-dihydroxy) acetamidophenyl aryl ketone.

The invention sought to be patented in a third alternate process of making aspect is described as residing in the concept of (a) reacting glyoxylic acid with a carboxylic acid anhydride or with a carboxylic acid anhydride in the presence of a carboxylic acid having a pK lower than 4.75; and (b) reacting the product with a 2-aminophenyl aryl ketone to form a 2-(2,2-diacyloxy)acetamidophenyl aryl ketone.

The invention sought to be patented in a principal composition aspect resides in the concept of a 2,2-dicarboxylicacyloxy acetic acid.

The tangible embodiments of the principal composition aspect of the invention possess the inherent general physical properties of being colorless to light yellow oils; they are high boiling with decomposition and are thus not distillable. Examination of the compounds of the principal composition aspect of the invention produced according to the hereinafter described process reveals upon infrared spectrum analysis, spectral data supporting the molecular structure hereinbefore set forth.

The tangible embodiments of the principal composition aspect of the invention as intermediates for other compositions of the invention possess the inherent applied use characteristics of being intermediate for the preparation of 1,3-dihydro-2H-1,4-benzodiazepin-2-ones which possess psycholeptic activity and which are described in U.S. Pat. Nos. 3,197,467; 3,198,789; and 3,296,249.

The invention sought to be patented in a second composition aspect resides in the concept of a 2,2-diacyloxyacetyl halide.

The tangible embodiments of the second composition aspect of the invention possess the inherent general physical properties of being liquids, high boiling with decomposition at atmospheric pressure and unstable in the presence of moisture. Examination of the compounds of the second composition aspect of the invention produced according to the hereinafter described process, reveals upon proton nuclear magnetic spectrum analysis, spectral data supporting the molecular structure hereinbefore set forth. For example, the presence of a single hydrogen on the carbon adjacent to carbonyl group is evident in the nuclear magnetic resonance spectrum. The aforementioned physical characteristics taken together with the elemental analysis, the nature of the starting materials, the mode of synthesis and the products produced therefrom confirm the molecular structure hereinbefore set forth.

The tangible embodiments of the second composition aspect of the invention as intermediates for other compositions of the invention possess the inherent applied use characteristics of being intermediates for the preparation of 1,3-dihydro-2H-1,4-benzodiazepin-2-ones which possess psycholeptic activity.

The invention sought to be patented in a third composition aspect resides in the concept of a 2-(2,2-diacyloxy) acetamidophenyl aryl ketone.

The tangible embodiments of the third composition aspect of the invention possess the inherent general physical property of being crystalline solids, soluble in polar organic solvents. Examination of the compounds of the third composition aspect of the invention produced according to the hereinafter described process reveals upon infrared and nuclear magnetic spectrum analysis, spectral data supporting the molecular structure hereinbefore set forth. For example, the presence and type of the carbonyl groups is evident in the infrared spectrum. The aforementioned physical characteristics taken together with the elemental analysis, the nature of the starting materials, the mode of synthesis and the products produced therefrom confirm the molecular structure hereinbefore set forth.

The tangible embodiments of the third composition of the invention as intermediates for the preparation of other compositions of the invention possess the inherent applied use characteristics of being intermediates for the preparation of 1,3-dihydro-2H-1,4-benzodiazepin-2-ones which possess psycholeptic activity. In addition, the tangible embodiments of the third composition aspect of the invention possess the inherent applied use characteristics of antagonizing the effects of tremorine in animals when tested according to standard pharmacological test procedures, as well as exhibiting an antimicrobial effect, particularly against B. subtilis, S. aureus, M. tuberculosis and E. histolytica when tested according to standard test procedures.

The invention sought to be patented in a fourth composition aspect resides in the concept of a 2-(2-acylamido-2-hydroxy)acetamidophenyl aryl ketone.

The tangible embodiments of the fourth composition aspect of the invention possess the inherent general physical properties of being high melting point solids, generally soluble in polar organic solvents. Examination of the compounds of the fourth composition of the invention produced according to the hereinafter described process, reveals upon infrared and nuclear magnetic spectrum analysis, spectral data supporting the molecular structure hereinbefore set forth. For example, the resonance of the methyl group of the 2-acetamido function appeared in the nuclear magnetic resonance spectrum. The aforementioned physical characteristics taken together with the elemental analysis, the nature of the starting materials, the mode of synthesis and the products produced therefrom, confirm the molecular structure hereinbefore set forth.

The tangible embodiments of the fourth composition aspect of the invention as intermediates for the preparation of other compositions of the invention possess the inherent applied use characteristics of being intermediates for the preparation of 1,3-dihydro-2H-1,4-benzodiazepin-2-ones which possess psycholeptic activity. In addition, they possess the inherent applied use characteristic of exerting an antimicrobial effect, particularly against E. histolytica and M. tuberculosis, when tested according to standard test procedures.

The invention sought to be patented in a fifth composition aspect resides in the concept of a 2-(2-acylamido-2-halo)acetamidophenyl aryl ketone.

The tangible embodiments of the fifth composition aspect of the invention possess the inherent general physical properties of being high melting, white crystalline solids, generally soluble in non-nucleophilic polar solvents. Examination of the compounds of the fifth composition aspect of the invention produced according to the hereinafter described process, reveals upon infrared and nuclear magnetic spectrum analysis, spectral data supporting the molecular structure hereinbefore set forth. For example, the presence of the keto carbonyl and amide carbonyl groups is evident in the infrared. The aforementioned physical characteristics taken together with the elemental analysis, the nature of the starting materials, the mode of synthesis and the products produced therefrom, confirm the molecular structure hereinbefore set forth.

The tangible embodiments of the fifth composition aspect of the invention possess the inherent applied use characteristics of being intermediates for the preparation of 1,3-dihydro-2H-1,4-benzodiazepine-2-ones which possess psycholeptic activity.

The invention sought to be patented in a sixth composition aspect resides in the concept of a 2-(2,2-dihydroxy) acetamidophenyl aryl ketone.

The tangible embodiments of the sixth composition aspect of the invention possess the inherent general physical properties of being crystalline solids, generally soluble in polar organic solvents. Examination of the compounds of the sixth composition aspect of the invention produced according to the hereinafter described process reveals upon infrared and nuclear magnetic spectrum analysis, spectral data supporting the molecular structure hereinbefore set forth. For example, the presence of the hydroxyl group is evident in the infrared spectrum. The aforementioned physical characteristics taken together with the elemental analysis, the nature of the starting materials, the mode of synthesis, and the products produced therefrom, confirm the molecular structure hereinbefore set forth.

The tangible embodiments of the sixth composition aspect of the invention as intermediate for the preparation of other compositions of the invention possess the inherent applied use characteristics of being intermediate for the preparation of 1,3-dihydro-2H-1,4-benzodiazepin-2-ones which possess psycholeptic activity.

The invention sought to be patented in a seventh composition aspect resides in the concept of a 2-(2-hydroxy-2-methoxy)acetamidophenyl aryl ketone.

The tangible embodiments of the seventh composition aspect of the invention possess the inherent general physical property of being crystalline solids, which in aqueous solvent are in equilibrium with the corresponding 2-(2,2-dihydroxy) acetamidophenyl aryl ketone. Examination of the compounds of the seventh composition aspect of the invention produced according to the hereinafter described process reveals upon infrared and nuclear magnetic spectrum analysis, spectral data supporting the molecular structure hereinbefore set forth. For example, the presence of the methyl hydrogens on the methyl group are evident in the nuclear magnetic resonance spectrum. The aforementioned physical characteristics taken together with the elemental analysis, the nature of the starting materials, the mode of synthesis and the products produced therefrom confirm the molecular structure hereinbefore set forth.

The tangible embodiments of the seventh composition aspect of the invention as intermediates for the preparation of other compositions of the invention possess the inherent applied use characteristics of being intermediates for the preparation of 1,3-dihydro-2H-1,4-benzodiazepin-2-ones which possess psycholeptic activity. In addition, they possess the inherent applied use characteristic of antagonizing the effects of tremorine, as well as lowering the blood sugar concentration, in animals when tested according to standard pharmacological test procedures.

The invention sought to be patented in an eighth composition aspect resides in the concept of a 2'-aroylglyoxanilide.

The tangible embodiments of the eighth composition aspect of the invention possess the inherent general physical property of being white to yellow crystalline solids, soluble in polar organic solvents. Examination of the compounds of the eighth composition of the invention produced according to the hereinafter described process reveals upon infrared and nuclear magnetic spectrum analysis, spectral data supporting the molecular structure hereinbefore set forth. For example, the presence of the aldehydic proton is evident in the nuclear magnetic resonance spectrum, and the aldehyde and amide groups are evident in the infrared spectrum. The aforementioned physical characteristics taken together with the elemental analysis, the nature of the starting materials, and the mode of synthesis confirm the molecular structure hereinbefore set forth.

The tangible embodiments of the eighth composition aspect of the invention as intermediates for the preparation of other compositions of the invention possess the inherent applied use characteristics of being intermediates for the preparation of 1,3-dihydro-2H-1,4-benzodiazepin-2-ones which possess psycholeptic activity.

They also possess the inherent applied use characteristic of antagonizing the effects of tremorine in animals when tested according to standard pharmacological test procedures.

The invention sought to be patented in a ninth composition aspect resides in the concept of the product obtained by reaction of glyoxylic acid with a carboxylic acid anhydride, or with a carboxylic acid anhydride in the presence of a carboxylic acid having a pK lower than 4.75.

The tangible embodiments of the ninth composition aspect of the invention possess the inherent general physical properties of being high boiling colorless to light yellow oils. Based on infrared spectral data, their failure to react with thionyl chloride, their ability to acylate amines under mild conditions, and from a consideration of the starting materials used and the mode of synthesis, the tangible embodiments of the invention are established to be acylated glyoxylic acid anhydrides.

The tangible embodiments of the ninth composition aspect of the invention as intermediates for the preparation of other compositions of the invention possess the inherent applied use characteristics of being intermediates for the preparation of 1,3-dihydro-2H-1,4-benzodiazepin-2-ones which possess psycholeptic activity.

The manner and processes of making and using the invention will now be generally described so as to enable a person skilled in the art to make and use the same as follows:

DESCRIPTION OF THE DRAWING

The new processes of my invention are illustrated schematically for the specific embodiment thereof in the annexed FIGURE, wherein the compounds are assigned Roman numerals for identification.

DESCRIPTION OF THE PREFERRED EMBODIMENTS

Referring to the FIGURE, in the first step of the principal process aspect of the invention, glyoxylic acid (I) is reacted with a carboxylic acid anhydride of an acid having a pK higher than 3.75, preferably acetic anhydride, in the presence of a carboxylic acid having a pK higher than 3.75, preferably acetic acid, to afford the corresponding diacyloxy acetic acid (II). The reaction may be performed in a non-reactive solvent if desired, but such solvent is not necessary, and in the preferred embodiment the reaction is performed neat in acetic acid. The temperature of reaction is not critical — the reaction can be run at room temperature — but for convenience is preferably run on the steam bath. The thus-obtained diacyloxy acetic acid is then treated in a non-reactive organic solvent with a halogenhydroxyl exchange agent, preferably thionyl chloride, to yield the corresponding diacyloxy acetyl halide (III). Examples of other halogen-hydroxyl exchange agents which may be used are thionyl bromide, phosphorous oxychloride, phosphorous oxybromide, phosphorous pentachloride, phosphorous pentabromide, oxalyl chloride, oxalyl bromide, 1,1-dichlorodimethyl ether, 1,1-dibromo-dimethyl ether, etc. The temperature of reaction is not critical and it can be performed from room temperature or below up to the reflux temperature of the solvent used. For convenience, reflux temperature is preferred. Heating the diacyloxyacetyl halide with a 2-aminophenyl aryl ketone in a non-reactive organic solvent, preferably methylene chloride or dichloroethane, affords the corresponding 2-(2,2-diacyloxy)acetamidophenyl aryl ketone (V). It is preferred that the amine be added to the acid halide in order to keep the latter in excess. While the temperature of reaction is not critical, heating at reflux is preferred. Treatment of the diacyloxyacetamidophenyl aryl ketone with ammonia in a non-reactive organic solvent yields the corresponding 2-(2-acylamido-2-hydroxy)acetamidophenyl aryl ketone (VI). Preferred solvents for this reaction are lower alkanols or acetonitrile, but any non-reactive organic solvent in which ammonia is at least somewhat soluble may be used. The temperature can be anywhere from 0° or below to quite high; the preferred range, however, is from 0° to 70°C. Upon treatment of the 2-(2-acylamido-2-hydroxy)acetamidophenyl aryl ketone with a halogen-hydroxyl exchange agent or a halogen acid there is obtained the corresponding 2-(2-acylamido-2-halo)acetamido phenyl aryl ketone (XIII). This reaction can be run in any non-reactive solvent or, in a preferred mode, can be run next in thionyl chloride. The temperature of reaction is not critical; if a solvent is used the reflux temperature of the solvent is most efficient, but when run neat in thionyl chloride room temperature is preferred. Reaction of the 2-(2-acylamido-2-halo) acetamido phenyl aryl ketone with ammonia in a non-reactive solvent, preferably ether or acetonitrile affords the corresponding 2-(2-acylamido-2-amino)acetamidophenyl aryl ketone (XIV). The temperature of reaction is not critical but is conveniently at room temperature or below.

The 2-(2-acylamido-2-amino)acetamidophenyl aryl ketone thus produced in the principal process aspect of this invention may then be cyclized to a 3-acylamido-1,3-dihydro-2H-1,4-benzodiazepin-2-one (XV) which may be hydrolyzed to the corresponding 3-amino compound (XVI) which in turn may be converted to the corresponding 3-hydroxy compound (XVII), all conversions being described in the art. Compound XVII, 7-chloro-1,3-dihydro-3-hydroxy-5-phenyl-2H-1,4-benzodiazepin-2-one, is the drug oxazepam, in medical use throughout the world as a tranquilizer and anti-anxiety agent.

In the first step of the first alternate process of making aspect of the invention, a 2-(2,2-diacyloxy)acetamidophenyl aryl ketone (V) is hydrolyzed by treatment with an inorganic base in a non-reactive solvent in the presence of water to afford the corresponding 2-(2,2-dihydroxy)acetamidophenyl aryl ketone (VII). The hydrolysis may be performed at any temperature from room temperature or below up to the reflux temperature of the solvent employed. Upon treatment of the dihydroxy compound with a lower alkyl primary amide, preferably acetamide, in a non-reactive solvent, preferably acetonitrile, there is obtained the corresponding 2-(2-acylamido-2-hydroxy) acetamidophenyl aryl ketone (VI). Any temperature from about room temperature up to the reflux temperature of the solvent may be used, although the latter is preferred.

In the second alternate process of making aspect of the invention, the starting dicarboxylicacyloxy tartaric anhydride (IX) is treated in a non-reactive organic solvent, preferably chloroform, with a 2-aminophenyl aryl ketone to yield the corresponding 2-(3-carboxy-2,3-dicarboxylicacyloxy)propionamidophenyl aryl ketone (X). Any temperature from about room temperature may be used, preferably the reflux temperature of the solvent. The 2-(3-carboxy-2,3-dicarboxylicacyloxy)-propionamidophenyl aryl ketone is then hydrolyzed with base in a non-reactive solvent, preferably with inorganic base such as sodium hydroxide in aqueous ethanol, and preferably at room temperature (although any temperature from well below room temperature up to the reflux temperature of the solvent may be used), to afford the corresponding 2-(3-carboxy-2,3-dihydroxy)propionamidophenyl aryl ketone (XI). Oxidation of this latter compound with a vic glycol cleaving agent, such as periodic acid or lead tetraacetate, affords the corresponding hydrated aroyl glyoxanilide, 2-(2,2-dihydroxy)acetamidophenyl aryl ketone (VII). The oxidation is performed in a non-reactive solvent whose choice will depend on the particular oxidizing agent chosen. Thus oxidation with periodic acid will be performed in an aqueous system; oxidation by lead tetraacetate is performed in the absence of water. The various vic glycol oxidizing systems are well known in the art. While the temperature of reaction is not critical, room temperature is preferred. If an alkanol is present during the isolation step, the product is obtained as the ether, i.e., the 2-(2-hydroxy-2-alkoxy)acetamidophenyl aryl ketone (XII). The latter compound and VII are readily interconvertable; thus recrystallization of XII from any appropriate solvent, e.g., acetonitrile, affords VII. Treatment of XII under dehydrating conditions, as by heating in thionyl chloride, affords the corresponding aroyl glyoxanilide (XVIII), which may be readily converted by known means to the glyoxanilide hydrate (VII).

In the third alternate process of making aspect of the invention, glyoxylic acid (I) is reacted with a carboxylic acid anhydride, or with a carboxylic acid anhydride in the presence of a carboxylic acid having a pK lower than 4.75, to afford acylated glyoxylic acid anhydrate (IV). The reaction can be run neat or in any non-reactive solvent, and while the temperature is not critical, is preferably run with heating. The structure of this product can not be simply represented; it comprises molecules of symmetrical diacylated glyoxylic anhydride, as depicted in the drawing, as well as mixed anhydrides. This product, upon reaction with a 2-aminophenyl aryl ketone in a non-reactive solvent will give the corresponding 2-(2,2-diacyloxy) acetamidophenyl aryl ketone (V). (If the anhydride or acid used in the preceding step is sufficiently strong, for example trifluoroacetic acid, the corresponding glyoxanilide (XVIII) can be obtained through deacylation and dehydration.) The temperature of reaction is not critical, but the reaction is conveniently run at the reflux temperature of the solvent used.

It will be apparent from the disclosure herein to those skilled in the art of organic chemistry that various positions on the 2-aminophenyl aryl ketones used in the processes of the invention can be substituted with non-interfering groups instead of hydrogen atoms. Therefore, in the processes of the invention, except for any limitations expressed in this specification, all 2-aminophenyl aryl ketones can be used. Similarly, in the various product aspects of the invention which contain the 2-aminophenyl aryl ketone moiety, the amino nitrogen can be substituted with hydrogen, an alkyl group such as methyl, ethyl, or propyl, an alkenyl group such as allyl or methyl allyl, or a lower aralkyl group such as benzyl or phenylethyl. The phenyl portion of the molecule can have one or more substituents other than hydrogen, as for example lower alkyl, chlorine, bromine, trifluoromethyl, nitro, or methylsulfonyl, at the 2, 3, 4 or 5 positions. The acyl nucleus can be phenyl, 2-thienyl, 3-thienyl, or 2-, 3-, or 4-pyridyl. The aryl nucleus can bear one or more simple substituents inert in the reactions herein described, such as lower alkyl, chlorine, bromine, trifluoromethyl, nitro, or methylsulfonyl, and such substituted nuclei are the full equivalents of the unsubstituted nuclei for the purposes of this invention.

In the principal and third alternate process of making aspects of the invention, it will be apparent to those skilled in the art of chemistry that any carboxylic acid anhydride or acid, substituted or unsubstituted, can be used (so long as the limitation as to acid strength is met) since the acyloxy group will not be present in the ultimate products of the invention or in the benzodiazepines with psycholeptic activity for which the products of this invention are intermediates. Similarly, in the second alternate process of making aspect of the invention, any carboxylicacyloxy groups can be present in the starting dicarboxylicacyloxy tartaric anhydride. For the processes of the invention, as well as for the compounds of the invention which contain carboxylicacyl groups, all such carboxylic acyl groups are full equivalents.

Where used in this application, the term halogenhydroxyl exchange agent means any of the agents known in the art of organic chemistry to be useful for replacing a hydroxyl group with a halogen atom, such as, but without limitation, thionyl halides, phosphorous oxyhalides, phosphorous pentahalides, oxalyl halides, and 1,1-dihalodimethyl ethers. The term acyloxy, wherever used in this specification, refers only to carboxylic acyloxy, and the term acyl only to carboxylic acyl.

The following examples illustrate the best mode contemplated by the inventors of carrying out the processes of the invention and of using as intermediates the compositions of the invention.

EXAMPLE 1

2,2-Diacetoxy-2'-Benzoyl-4'-Chloroacetanilide

Gloxylic acid monohydrate (2.00 g., 21.8 m mole) in 15 ml. of acetic anhydride was warmed on a steam bath for 1.25 hr. The excess reagent and volatile products were removed on a rotary evaporator. The residual oil was dissolved in toluene and the volatile constituents again removed on a rotary evaporator. The oily residue in 30 ml. of methylene chloride was added to 2.30 g. (10.0 m mole) of 2-amino-5-chlorobenzophenone dissolved in 70 ml. of methylene chloride. The solution was heated at reflux for 30 min. and the solvent was evaporated to give a light amber oil. The oil dissolved in 35 ml. of hot absolute ethanol was treated with 35 ml. of water and allowed to crystallize. Filtration of the colorless needles gave 2.074 g. of 2,2-diacetoxy-2'-benzoyl-4'-chloroacetanilide, m.p. 136°–138°.

Analysis for $C_{19}H_{16}ClNO_6$: Calculated: C, 58.55; H, 4.14; Cl, 9.10; N, 3.60. Found: C, 59.01; H, 3.97; Cl, 9.5; N, 3.97.

EXAMPLE 2

2,2-Dihydroxyacetylchloride, diacetate

Glyoxylic acid, monohydrate (64.0 g.) and 480 ml. (ca. 520 g.) of acetic anhydride and 160 ml. of glacial acetic acid were combined and heated on a steam bath for 2 hr. The solvents were removed on a rotary evaporator and the remaining traces of acetic acid and acetic anhydride were removed by codistillation with 100 ml. of toluene. The residue was dissolved in 350 ml. of methylene chloride and treated with 180 ml. (298 g.) of thionyl chloride. The mixture was heated at gentle reflux for 20 min. and evaporated on a rotary evaporator. An additional 100 ml. of methylene chloride was added and reevaporated to remove traces of volatile reactants. The acid chloride could be condensed with various amines without further purification. A portion of the material was purified by vacuum distillation [b.p. 58°–59° (0.5 mm.), $n_D^{25}$ 1.4276]. The proton nuclear magnetic resonance spectrum ($CDCL_3$) exhibited two peaks at 2.21 δ and 6.91 δ in ratios of 6:1.

Analysis for $C_6H_7ClO_5$: Calculated: C, 37.03; H, 3.63. Found: C, 36.99; H, 3.90.

EXAMPLE 3

2'-Benzoyl-2,2-Dihydroxy-4'-Chloroacetanilide, Diacetate

Glyoxylic acid monohydrate (4.0 g., 0.0435 mole) in 20 ml. of glacial acetic acid was treated with 30 ml. (ca. 317 mole) acetic anhydride and the mixture was heated for 1.5 hr. on the steam bath. The volatile solvents were removed on a rotary evaporator and the remaining traces of solvent were removed by codistillation with toluene. The oily residue disolved in 20 ml. of methylene chloride was treated with 10 ml. (ca. 0.138 mole) of thionyl chloride and the solution was heated at reflux for 20 min. Solvent and excess reagent were removed on a rotary evaporator. The residue was redissolved in 20 ml. of methylene chloride and the solvent reevaporated. The residue dissolved in 90 ml. of methylene chloride was heated at reflux and treated dropwise over 10 min. with a solution of 4.5 g. (0.0194 mole) of 2-amino-5-chlorobenzophenone dissolved in 30 ml. of methylene chloride. The reaction solution was refluxed for an additional 10 min. and the solvent was removed on a rotary evaporator. Treatment of the light yellow oil with 30 ml. of ethanol caused colorless crystals to separate. The mixture was chilled, filtered, washed with cold ethanol and dried overnight in vacuum oven at 50°C. to give 5.78 g. (76.4% yield based on 2-amino-5-chlorobenzophenone) of 2'-benzoyl-2,2-dihydroxy-4'-chloroacetanilide, diacetate, m.p. 138°–140°.

EXAMPLE 4

4'-Chloro-2'-(o-Chlorobenzoyl)-2,2-Dihydroxyacetanilide, Diacetate

Glyoxylic acid monohydrate (8.0 g., 0.087 m mole) in 20 ml. of glacial acetic acid was heated for 1.5 hours with 60 ml. of acetic anhydride on a steam bath. The solvents were evaporated on the rotary evaporator and remaining traces of solvent were removed by codistillation with toluene. The oily residue dissolved in 40 ml. of methylene chloride was treated with 20 ml. of thionyl chloride and the solution was heated at reflux for 20 min. Solvent and excess reagent were removed on a rotary evaporator. The oily residue in 200 ml. of methylene chloride was stirred at gentle reflux and treated dropwise with a solution of 10.4 g. of 2-amino-2',5-dichlorobenzophenone in 60 ml. of methylene chloride. The solution was refluxed for 15 min. after the addition of the amine was completed. Evaporation of the solvent on a rotary evaporator gave a light amber oil which crystallized spontaneously upon addition of 60 ml. of ethanol. Filtration of the crystals afforded 14.2 g. (85%) of 4'-chloro-2'-(o-chlorobenzoyl)-2,2-dihydroxyacetacetanilide, diacetate, m.p. 157°–160°. The analytical sample was recrystallized to constant melting point (161°–163°) from acetonitrile.

Analysis for $C_{19}H_{15}Cl_2NO_6$: Calculated: C, 53.79; H, 3.56; Cl, 16.71; N, 3.30. Found: C, 53.81; H, 3.31; Cl, 16.9; N, 3.51.

EXAMPLE 5

2'-Benzoyl-4'-Chloro-2,2-Dihydroxy-N-Methylacetanilide, Diacetate

5-Chloro-2-methylaminobenzophenone (4.92 g.) in 55 ml. of methylene chloride was added dropwise over 30 min. to a refluxing solution of 7.80 g. of 2,2-diacetoxyacetyl chloride in 60 ml. of methylene chloride. The reaction solution was heated at reflux for an additional 20 min. after the addition of the amine was complete. The solvent was removed on the rotary evaporator and the residue was taken up in ether and extracted successively with water, 2N hydrochloric acid, dilute sodium bicarbonate solution and water. The ether extract was dried over anhydrous magnesium sulfate and evaporated to an oil which crystallized spontaneously upon treatment with ethanol. Filtration gave 4.93 g. of 2'-benzoyl-4'-chloro-2,2-dihydroxy-N-methyl-acetanilide, diacetate, m.p. 112°–114°.

Analysis for $C_{20}H_{18}ClNO_6$: Calculated: C, 59.48; H, 4.49; H, 3.47. Found: C, 59.25; H, 4.42; N, 3.65.

EXAMPLE 6

2-Acetamido-2'-Benzoyl-4'-Chloro-2-Hydroxyacetanilide 2,2-Diacetoxy-2'-benzoyl-4'-chloroacetanilide (500 mg., 1.28 m mole) was added to 38 ml. of anhydrous methanol that had been previously saturated with anhydrous ammonia at 0°C. The cold solution was stirred for 50 min. and allowed to warm gradually to room temperature. Evaporation of the solvent on a rotary evaporator left a light yellow oil which crystallized from benzene to give 246 mg. of 2-acetamido-2'-benzoyl-4'-chloro-2-hydroxyacetanilide. The infrared spectrum of the product was identical to the spectrum of the material prepared as described in Example 9.

EXAMPLE 7

2-Acetamido-2'-Benzoyl-4'-Chloro-2-Hydroxyacetanilide

2'-Benzoyl-4'-chloro-2,2-dihydroxyacetanilide, diacetate (7.796 g., 20 m mole) suspended in 250 ml. of anhydrous methanol was stirred at 27° and treated gradually with 10 ml. of 2.98 N methanolic ammonia solution. The mixture was stirred at 27° for 25 minutes and the resulting clear solution was evaporated on a rotary evaporator to oil. Upon treatment of the oil with benzene followed by water, crystals separated in the two phase mixture. The solid was filtered from the mixture and washed with water to give 5.489 g. (79%) of product, m.p. 152°–158°. Recrystallization from $CH_3CN$ gave 2-acetamido-2'-benzoyl-4'-chloro-2-hydroxyacetanilide, m.p. 162°–164°.

Nuclear magnetic resonance spectrum data ($d_6$-DMSO): The resonance of the methyl group fo the 2-acetamido function appeared as a singlet at 1.92 δ (3H). The 2-proton absorbed as a multiplet at 5.60 δ (1H) which collapsed to a singlet at 5.60 δ upon treatment with $D_2O$. A $D_2O$ exchangeable proton showed resonance absorption as a doublet (J = 5Hz) at 7.05 δ (1H) and was assigned to the 2-hydroxyl group proton. The aromatic protons of the benzoyl group and two additional aromatic protons appeared as a multiplet centered at 7.65 δ (7H). A single aromatic proton absorbed as a doublet (J = 9Hz) at 8.45 δ. The $D_2O$ exchangeable proton at 8.75 δ appeared as a doublet (J = 9Hz) and was assigned to the H-N of the 2-acetamido group. The anilide proton absorbed at 11.1 δ and disappeared on deuterium exchange.

EXAMPLE 8

2-Acetamido-4'-Chloro-2'-(o-Chlorobenzoyl)-2-Hydroxyacetanilide

4'-Chloro-2'-(o-chlorobenzoyl)-2,2-dihydroxyacetanilide, diacetate (16.96 g., 80 m moles) in 240 ml. of methanol was stirred and treated gradually with 20 ml. of 2.98 N methanolic ammonia at 26°. After 1.5 hrs. the small amount of undissolved residue was filtered and the filtrate was evaporated until crystals separated. Filtration of the chilled mixture afforded 8.1 g. of product, m.p. 180°–182°. An additional 1.17 g. of product was obtained by evaporation of the filtrate, treatment of the residue with benzene and water, and filtration of the crystalline precipitate. Recrystallization of 4.1 g. of the product gave 2.23 g. of 2-acetamido-4'-chloro-2'-(o-chlorobenzoyl)-2-hydroxyacetanilide, m.p. 185°–187°.

Analysis for $C_{17}H_{14}Cl_2N_2O_4$: Calculated: C, 53.57; H, 3.70; N, 7.35. Found: C, 53.82; H, 3.65; N, 7.52.

EXAMPLE 9

2-Acetamido-2'-Benzoyl-4'-Chloro-2-Hydroxyacetanilide

Acetamide (0.591 g., 10.0 m mole) was added to 25 ml. of boiling acetonitrile and the solution was treated with 3.047 g. (10.0 m mole) of 2-benzoyl-4-chloroglyoxanilide monohydrate. The mixture was refluxed for 10 min., filtered hot from any insoluble material and allowed to crystallize overnight. Filtration afforded 1.68 g. of product, m.p. 163°–164°. Upon standing for 2 weeks three additional crops of product separated to raise the total yield to 2.72 g. Recrystallization from hot acetonitrile gave 2-acetamido-2'-benzoyl-4'-chloro-2-hydroxyacetanilide, m.p. 163°–164°.

Analysis for $C_{17}H_{15}ClN_2O_4$: Calculated: C, 58.87; H, 4.36; Cl, 10.22; N, 8.08. Found: C, 59.15; H, 4.26; Cl, 10.3; N, 8.55.

EXAMPLE 10

2-Acetamido-2'-Benzoyl-2,4'-Dichloroacetanilide

To 15 ml. of thionyl chloride was added 1.0 g. (2.88 m mole) of 2-acetamido-2'-benzoyl-4'-chloro-2-hydroxyacetanilide and the mixture was warmed with agitation on a steam bath for 3 min. The excess thionyl chloride was removed on a rotary evaporator leaving a colorless crystalline residue. Filtration of the residue, which was slurried in anhydrous ether, gave 0.892 g. of 2-acetamido-2'-benzoyl-2,4'-dichloroacetanilide, m.p. 168°–170°, dec. The nuclear magnetic resonance spectrum exhibited the following peaks in $d_6$-DMSO: singlet 1.90 δ (3H); doublet, J = 8 cps, 5.55 δ (1H); multiplet at 7.3 – 7.8 δ (7H); doublet, J = 9 cps, 8.41 δ (1H); singlet 10.0 δ (1H); and singlet 11.15 δ (1H).

Analysis for $C_{17}H_{14}N_2O_3Cl_2$: Calculated: C, 55.91; H, 3.86; N, 7.68; Cl, 19.42. Found: C, 55.86; H, 3.78; N, 7.62; Cl, 19.6.

EXAMPLE 11

2-Acetamido-2'-Benzoyl-2,4'-Dichloroacetanilide

2-Acetamido-2'-benzoyl-4'-chloro-2-hydroxyacetanilide (500 mg.) was added to a solution of glacial acetic acid saturated with anhydrous hydrogen chloride at 27°. The resulting solution was stirred at 27° for 45 min. and the white crystalline product which separated was slurried in ether and filtered. The infrared spectrum of the 2-acetamido-2'-benzoyl-2,4'-dichloroacetanilide was identical to material made from reaction of the above starting material with thionyl chloride.

EXAMPLE 12

2-Acetamido-2'-(o-Chlorobenzoyl)-2,4'-Dichloroacetaniline

2-Acetamido-4'-chloro-2'-(o-chlorobenzoyl)-2-hydroxyacetanilide (2.00 g., 5.0 m mole) was added to 20 ml. of thionyl chloride and the mixture was agitated at 26° for 5 min. and at 60° for 5 min. The yellow solution was evaporated on a rotary evaporator leaving a crystalline residue. The solid was slurried in ether and filtered to give 1.932 g. of 2-acetamido-2'-(o-chlorobenzoyl)-2,4'-dichloroacetanilide, m.p. 245°–248° dec Analysis for $C_{17}H_{13}Cl_3N_2O_3$: Calculated: C, 51.06; H, 3.28; N, 7.01 Found: C, 50.85; H, 3.17; N, 6.87

EXAMPLE 13

2-Acetamido-2'-(o-Chlorobenzoyl)-2,4'-Dichloroacetanilide

2-Acetamido-4'-chloro-2'-(o-chlorobenzoyl)-2-hydroxyacetanilide (500 mg., 1.25 m mole) slurried in 10 ml. of p-dioxane was chilled in an ice bath and treated with a stream of dry hydrogen chloride until most of the solid dissolved. The solution was stirred at 27° for 2 hr. and filtered from a small amount of finely suspended material. The filtrate was evaporated on a rotary evaporator and upon treatment of the residual oil with cold ether crystals separated spontaneously. Filtration afforded 411 mg. of 2-acetamido-2'-(o-chlorobenzoyl)-2,4'-dichloroacetanilide, m.p. 239°–243°.

EXAMPLE 14

3-Acetamido-7-Chloro-1,3-Dihydro-5-Phenyl-2H-1,4-Benzodiazepin-2-One

2-Acetamido-2'-benzoyl-2,4'-dichloroacetanilide (500 mg.) as obtained in Example 10 was added to 50 ml. of methanol which had been saturated at 0° with anhydrous ammonia. The solution was allowed to warm to room temperature for 15 minutes and then heated at reflux for 1.25 hr. The methanol was removed on a rotary evaporator leaving an oil. Treatment of a portion of the oil with acetonitrile caused a solid to separate which on the basis of spectral evidence is believed to be 2-acetamido-2-amino-2'-benzoyl-4'-chloroacetanilide. The bulk of the oily residue and the solid which separated were dissolved in 50 ml. of methanol containing 1.0 ml. of glacial acetic acid. The solution was refluxed for 30 min. filtered from a small amount of insoluble solid, and evaporated to an oily residue. Treatment of the residue with acetonitrile caused 375 mg. of 3-acetamido-7-chloro-1,3-dihydro-5-phenyl-2H-1,4-benzodiazepin-2-one (m.p. 268°–269°) to separate. The product did not cause depression of the melting point of an authentic sample of 3-acetamido-7-chloro-1,3-dihydro-5-phenyl-2H-1,4-benzodiazepin-2-one, prepared by a different route. The infrared spectra of the two samples were identical.

EXAMPLE 15

2-Acetamido-2-Amino-2'-(o-Chlorobenzoyl)-4'-Chloroacetanilide

To 50 ml. of anhydrous methanol that had been saturated at 0°C. with ammonia was added 500 mg. (1.25 m mole) of 2-acetamido-2'-(o-chlorobenzoyl)-2,4'-dichloroacetanilide. The mixture was stirred and allowed to warm to room temperature and then stirred at reflux for 1 hr. Evaporation of the solvent gave a solid residue. The residue was slurried in ethanol and filtered to give 378 mg. of 2-acetamido-2-amino-2'-(o-chlorobenzoyl)-4'-chloroacetanilide (m.p. 154°–158°) which had an infrared spectrum that was identical to the spectrum of authentic material.

EXAMPLE 16

2'-Benzoyl-4'-Chloroglyoxanilide, Hydrate 2,2-Diacetoxy-2'-benzoyl-4'-chloroacetanilide slurried in methanol was treated with an excess of aqueous sodium hydroxide and heated at reflux for 10 minutes. The solution was acidified with acetic acid and diluted with water. The solid which separated was filtered, and allowed to dry at room temperature to give 2-benzoyl-4'-chloroglyoxanilide, hydrate, m.p. 114°–116°.

EXAMPLE 17

2'-Benzoyl-4'-Chlorotartaranilic Acid, Diacetate

A solution of 169 g. (0.769 mole) of diacetyl-d-tartaric anhydride in 500 ml. of chloroform was added to 160 g. (0.690 mole) of 2-amino-5-chlorobenzophenone in 600 ml. of chloroform. The solution was warmed on a steam bath for one hour and the solvent was evaporated leaving a crystalline residue. Two recrystallizations of the residue from ethanol gave 266 g. (85%) of 2-benzoyl-4'-chlorotartaranilic acid, diacetate, m.p. 210°–213°.

Analysis for $C_{21}H_{18}ClNO_8$: Calculated: C, 56.32; H, 4.05; N, 3.13; Cl, 7.92. Found: C, 56.14; H, 3.98; N, 3.06; Cl, 7.8.

EXAMPLE 18

2'-Benzoyl-4'-Chlorotartaranilic Acid

A slurry of 204 g. of 2'-benzoyl-4'-chlorotartaranilic acid, diacetate in 2500 ml. of ethanol was treated with 410 ml. of 4N sodium hydroxide solution. Treatment of the solution with additional ethanol caused precipitation of the sodium salt, which was separated from the solvent by decantation. The salt was dissolved in dilute hydrochloric acid and a solid separated spontaneously. The precipitate was filtered and washed with acetonitrile to afford 114 g. (69%) of product, m.p. 193°–195°. Recrystallization of a portion of the material from acetonitrile gave pure 2'-benzoyl-4'-chlorotartaranilic acid, m.p. 196°–198°.

Analysis for $C_{17}H_{14}ClNO_6$: Calculated: C, 56.13; H, 3.88; N, 3.85; Cl, 9.75. Found: C, 56.29; H, 3.85; N, 4.11; Cl, 10.0.

EXAMPLE 19

2'-Benzoyl-4'-Chloro-2-Hydroxy-2-Methoxyacetanilide

A solution of 18.9 g. of periodic acid in 210 ml. of water was added over 45 minutes to a solution of 30.0 g. of 2'-benzoyl-4'-chlorotartaranilide in 700 ml. of dioxane. The mixture was stirred at 27° for 1 hr. and 700 ml. of water was added. The dioxane was evaporated on the rotary evaporator leaving an oily solution from which solid slowly precipitated. The solid was recrystallized from methanol-ether to give 8.5 g. of 2'-benzoyl-4'-chloro-2-hydroxy-2-methoxyacetanilide, m.p. 119°–121°.

The nuclear magnetic resonance spectrum exhibits a singlet at 3.65$\delta$ (3H), a singlet at 5.2 $\delta$ (1H), a multiplet at 7.5 – 7.9 $\delta$ (7H), a doublet at 8.8 (1H) and a singlet at 11.43 (1H).

Analysis for $C_{16}H_{14}NO_4Cl$: Calculated: C, 60.10; H, 4.41; N, 4.38; Cl, 11.09. Found: C, 60.02; H, 4.50; N, 4.46; Cl, 11.1.

EXAMPLE 20

2'-Benzoyl-4'-Chloroglyoxanilide, Hydrate

A solution of 12.7 g. of periodic acid in 140 ml. of water was added dropwise over 40 min. to a solution of 20.0 g. of 2'-benzoyl-4'-chlorotortaranilic acid in 500 ml. of dioxane. The solution was stirred at 27° for one hour and the volume of the solution was reduced to ca. 250 ml. on a rotary evaporator. The residue was treated with 200 ml. of methanol and 200 ml. of water and chilled. On standing 12.4 g. of 2'-benzoyl-4'-chloro-2-hydroxy-2-methyoxyacetanilide (mp 109–113) slowly separated from solution. The IR and N.M.R. spectra of the product were identical to the spectra of the material prepared in Example 19. Recrystallization of the 2'-benzoyl-4'-chloro-2-hydroxy-2-methoxyacetanilide from a small quantity of acetonitrile gave 6 g. of 2'-benzoyl-4'-chloroglyoxanilide, hydrate, m.p. 114°–116°.

The NMR spectrum exhibits a singlet at 5.1$\delta$ (1H), a broad doublet at 6.9$\delta$ (2H), multiplet 7.4 – 7.9$\delta$ (7H), doublet at 8.54$\delta$ (1H) and singlet at 11.0$\delta$ (1H).

Analysis for $C_{15}H_{12}NO_4Cl$:
Calculated: C, 58.77; H, 4.21; N, 4.57; Cl, 11.57.
Found: C, 58.73; H, 4.05; N, 4.43; Cl, 11.6.

EXAMPLE 21

2'-Benzoyl-4'-Chloroglyoxanilide

To 70 ml. of thionyl chloride was gradually added with stirring 10.0 g. (31.3 m mole) of 2'-benzoyl-4'-chloro-2-hydroxy-2-methoxyacetanilide. The solution was stirred and heated at gentle reflux for 30 min. The excess thionyl chloride was evaporated on a rotary evaporator and the residue was crystallized in acetonitrile. Filtration of the crystals afforded 4.2 g. (47%) of product, m.p. 129°–132°. Recrystallization from acetonitrile gave analytically pure 2'-benzoyl-4'-chloroglyoxanilide, m.p. 134°–136°.

The nuclear magnetic resonance spectrum in $CDCl_3$ exhibits a multiplet at 7.3 – 8.0$\delta$ (7H) and a doublet at 8.75$\delta$ (1H) for the aromatic protons, a singlet at 9.46$\delta$ (1H), for the aldehydic proton and a singlet at 11.7$\delta$ (1H). The infrared spectrum (KBr) has bands at 5.75$\mu$ (aldehyde) 5.90 and 6.60$\mu$ (amide).

Analysis for $C_{15}H_{10}ClNO_3$:
Calculated: C, 62.62; H, 3.50; N, 4.87; Cl, 12.32.
Found: C, 62.90; H, 3.49; N, 4.75; Cl, 12.34.

EXAMPLE 22

2'-Benzoyl-4'-Chloroglyoxanilide

To a stirred slurry of 22.0 g. of glyoxylic acid monohydrate in 109 g. of trifluoroacetic acid was slowly added 203 g. of trifluoroacetic anhydride. The resultant solution was refluxed for 3 hrs. and cooled to room temperature. The bulk of the solvent was removed on the rotary evaporator and residual traces were removed by codistillation with toluene. The infrared spectrum of the crude residue exhibited bands at 3.25 and 4.0$\mu$ (broad, bonded OH); 5.53 and 5.67$\mu$ (carbonyl); 8.15 and 8.53 (strong, broad).

A portion of the crude residue (11.4 g.) in 100 ml. of methylene chloride was stirred, heated at reflux, and treated dropwise over 15 min. with a solution of 2.3 g. of 2-amino-5-chlorobenzophenone. The red solution was poured into water. The methylene chloride layer was separated and washed twice with water, then with 3% sodium bicarbonate and again with water. The methylene chloride solution was dried ($MgSO_4$) and evaporated on rotary evaporator. The residue was slurried in hexane and filtered. Most of the crude residue was dissolved in hot heptane and the solution filtered. The yellow solid that separated from the filtrate (m.p. 121°–124°) was identified as 2'-benzoyl-4'-chloroglyoxanilide since the infrared and nmr spectra were identical to that of the product obtained in Example 21.

EXAMPLE 23

2,2-Dihydroxyacetyl Chloride, Dipropionate

Glyoxylic acid, monohydrate (46.0 g., 0.50 mole) slurried in 105 ml. of propionic acid was treated in one portion with 338 ml. (ca. 475 g., 3.65 mole) of propionic anhydride. The mixture was heated on the steam bath with occasional agitation for 3 hrs. and allowed to stand 16 hours at 27°. The excess propionic anhydride and acid was removed on a rotary evaporator and the residue was dissolved in toluene and re-evaporated. The crude residue of 2,2-dihydroxyacetic acid, dipropionate was examined by infrared analysis (bands at 3.2 and 3.9$\mu$ very broad, 3.44$\mu$, 5.46$\mu$ and 5.68$\mu$ broad) and was carried on to the formation of acid chloride without purification. The residue dissolved in 175 ml. of methylene chloride was treated with 144 ml. (ca. 238 g.) of thionyl chloride. After the solution was refluxed for 2 hrs., the solvent was removed on a rotary evaporator. Traces of thionyl chloride were removed by repeatedly redissolving the residue in methylene chloride followed by evaporation in vacuo. A portion of the residue (61.4 g.) was purified by vacuum distillation [b.p. 80°–83° (0.75 mm), $n_D^{22.5}$ 1.4321]. The nmr spectrum (neat) exhibited peaks at $\delta$ 1.18 (t, 6,J=7.5 Hz), $\delta$ 2.50 (q, 4,J=7.5 Hz) and $\delta$ 6.96 (s, 1). The infrared spectrum (neat) exhibited carbonyl absorption at 5.56$\mu$ and 5.68$\mu$.

Analysis for $C_8H_{11}ClO_5$:
Calculated: C, 43.17; H, 4.98.
Found: C, 43.19; H, 5.14.

EXAMPLE 24

2'-Benzoyl-4'-Chloro-2,2-Dihydroxyacetanilide, Dipropionate

To a stirred, refluxing solution of 10.00 g. (45 m mole) of 2,2-dihydroxyacetyl chloride, dipropionate in 90 ml. of methylene chloride was added 6.96 g. (30 m mole) of 2-amino-5-chlorobenzophenone in 75 ml. of methylene chloride. After 30 min. the addition was complete and the reaction was refluxed 15 min. longer. The methylene chloride solution was extracted successively with water, sodium carbonate solution and then dried by passage through cotton. Evaporation of the solvent afforded an oil which on treatment with 50 ml. of absolute ethanol, and chilling gave 10.75 g. (86%) of 2-benzoyl-4'-chloro-2,2-dihydroxyacetanilide, dipropionate, m.p. 84°–86°.

The i.r. spectrum (KHr) had bands at $3.14\mu$ (NH), $5.73\mu$ (ester CO), $5.88\mu$ (amide) 6.14 (ketone CO), and $6.17\mu$ strong broad (amide II). The nmr spectrum (CDCL$_3$) exhibited peaks at $\delta$ 1.20 (t, 6 J=7.5 Hz), $\delta$ 2.57 (q, 4, J=7.5 Hz), $\delta$ 7.1 (s, 1), $\delta$ 7.35–7.90 (m, 7), $\delta$ 8.75 (d, 1, J=10 Hz), and $\delta$ 11.63 (s, 1).

Analysis for $C_{21}H_{20}ClNO_6$:
Calculated: C, 60.36; H, 4.82; N, 3.35.
Found: C, 60.35; H, 4.75; N, 3.07.

EXAMPLE 25

2'-Benzoyl-4'-Chloro-2-Hydroxy-2-Propionamidoacetanilide

2'-Benzoyl-4'-chloro-2,2-dihydroxyacetanilide, dipropionate (2.09 g., 5.0 m mole) slurried in 50 ml. of methanol was treated in one portion with 3.0 ml. of 3N methanolic ammonia. After the mixture was stirred for 35 min. at 27° the solvent was removed on a rotary evaporator. Treatment of the oily residue with benzene and water afforded crystalline material which was then filtered from the two phase solvent system. The residue was washed with water and dried in a vacuum oven to afford 1.15 g. (64%) of 2'-benzoyl-4'-chloro-2-hydroxy-2-propionamidoacetanilide, m.p. 134°–136°.

The i.r. spectrum (KBr) had bands at $3.07\mu$ (NH), $5.89\mu$ and $6.15\mu$ (amides and acyl ketone); $6.65\mu$ strong broad (amide II). The nmr spectrum (CDCl$_3$) exhibited peaks at $\delta$ 1.10 (t, 3, J=7.5 Hz), $\delta$ 2.29 (q, 2, J=7.5 Hz), $\delta$ 5.75 (dc 1, J=7 Hz), $\delta$ 7.1–7.8 (m, 7), $\delta$ 8.45 (d, 1, J=10 Hz), and $\delta$ 11.35 (s, 1).

Analysis for $C_{18}H_{17}ClN_2O_4$:
Calculated: C, 59.92; H, 4.75; N, 7.76.
Found: C, 60.23; H, 4.46; N, 7.52.

EXAMPLE 26

2'-Benzoyl-4'-Chloro-2,2-Dihydroxyacetanilide, Acetate, Formate

To 149 g. of acetic anhydride chilled to 0° was added gradually 69 ml. of formic acid. The mixture was warmed to 50° for 10 min., chilled and treated with an additional 69 ml. of formic acid, and reheated to 50° for 10 min. and again chilled. Glyoxylic acid monohydrate (18.4 g.) in 60 ml. of formic acid was added to the chilled solution and the mixture was allowed to stand at 27° for 17 hr. The solvents were removed on the rotary evaporator and the residue was treated twice with toluene and repeatedly evaporated.

A portion of the residue (6.68 g.) in 60 ml. of methylene chloride was stirred and heated at gentle reflux. A solution of 4.62 g. of 2-amino-5-chlorobenzophenone in 60 ml. of methylene chloride was added over 20 min. to the refluxing solution. After the addition was complete the deep red solution was refluxed for 10 min. and allowed to stand at room temperature for 4 hr. The solution was washed with water and salt solution, filtered through cotton, and dried (MgSO$_4$). Evaporation of the solvent afforded an oil that crystallized in cold ethanol. Filtration gave 3.45 g. of 2'-benzoyl-4'-chloro-2,2-dihydroxyacetanilide, acetate, formate, m.p. 121°–124°. The analytical sample was recrystallized from ethanol (m.p. 127°–129°). The infrared spectrum (KBr) exhibited bands at $3.20\mu$ (NH); $5.66\mu$, 5.77 (ester CO) as a shoulder on amide band at $5.82\mu$, $6.16\mu$ (ketone CO) and $6.59\mu$ (amide II). The nmr spectrum (CDCl$_3$) exhibited peaks at $\delta$ 2.31 (s, 3), $\delta$ 7.10 (s, 1), $\delta$ 7.40–7.85 (m, 7) $\delta$ 8.15 (s, 1), $\delta$ 8.62 (d, 1, J=10 Hz) and $\delta$ 11.6 (s, 1).

Analysis for $C_{18}H_{14}ClNO_6$:
Calculated: C, 57.53; H, 3.76; N, 3.73.
Found: C, 57.70; H, 3.83; N, 3.72.

The subject matter which applicants regard as their invention is particularly pointed out and distinctly claimed as follows:

1. 2,2-diloweralkanoyloxy acetyl halide.
2. The compound according to claim 1, 2,2-diacetoxy acetylchloride.

* * * * *